Patented Sept. 5, 1922.

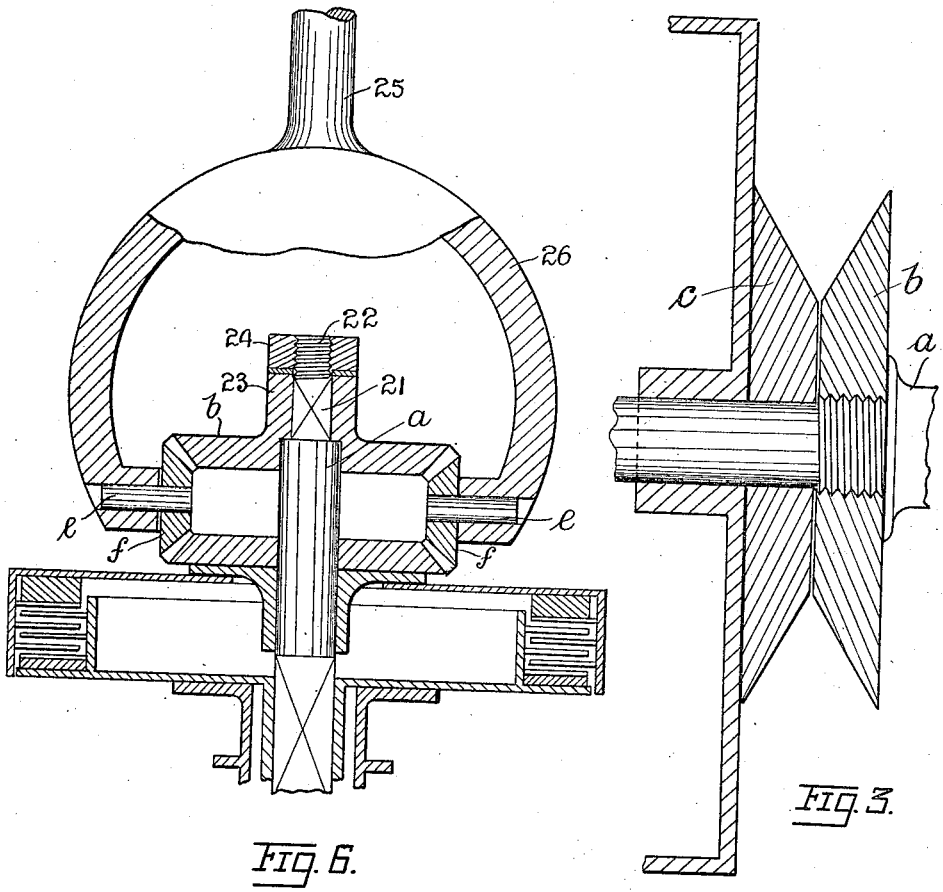
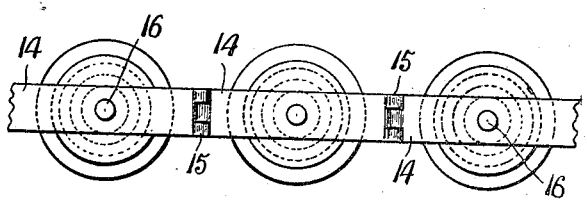
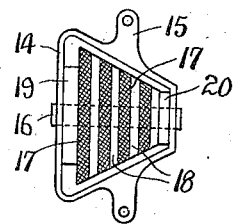

1,428,346

UNITED STATES PATENT OFFICE.

CHARLES HENRY STRONG, OF LONDON, ENGLAND.

CHANGE-SPEED AND CLUTCHING MECHANISM.

Application filed October 31, 1919. Serial No. 334,801.

*To all whom it may concern:*

Be it known that I, CHARLES HENRY STRONG, a subject of the King of Great Britain and Ireland, residing at London, England, have invented certain new and useful Improvements in or Relating to Change-Speed and Clutching Mechanism, of which the following is a specification.

This invention relates to a change speed gear and clutching mechanism, of the type wherein differential gearing is employed through which power is transmitted from the driving shaft to the driven shaft.

The object of the invention is to provide a simple and efficient apparatus of the type in question wherein varying speeds between zero and a maximum equivalent to the speed of the driving shaft may be obtained with facility.

According to the invention I provide upon the engine shaft or the driven shaft, and keyed or otherwise attached so as to rotate therewith, a bevel wheel or the like forming one member of an epicyclic or differential gear and I mount upon the same shaft so that it is slidable thereon, but rotatable therewith, one half of a clutch of the disc or plate type.

Another bevel wheel, forming another member of the differential gear is mounted freely upon the shaft and has connected thereto the other half of the clutch, in such a way that by sliding the first mentioned member of the clutch in an appropriate manner the second member and with it the second portion of the differential gear may be driven at a speed which gradually increases from zero, until the two parts of the clutch and the two parts of the differential gear rotate as a whole.

For transmitting power from the differential, various means may be adopted.

In the usual way I provide upon an annulus or the like planet pinions adapted to mesh with the bevel wheels of the differential: the annulus being formed as or provided on the outer periphery with a pulley wheel, sprocket wheel or the like formed in two parts suitably bolted together for driving the belt or chain.

In some cases in place of providing the planet pinions or an annulus I may suitably carry these upon the belt or chain itself.

In the preferred construction I provide spring means tending to push the parts of the clutch normally into engagement, and furnish means operated, for instance by a lever or pedal for holding them out of engagement; but in some cases this arrangement may be reversed.

I provide a belt connection with the casing of the clutch in order to hold one of the members, namely the loose one upon the shaft, thus enabling the drive through the differential to be effected at half speed.

In place of providing a belt or chain drive, the apparatus may be modified for use as a counter shaft gear.

And in order that my invention may be better understood, I will now proceed to describe the same with reference to the accompanying drawings in which:—

Fig. 3 shows an axial section of the differential according to a modified form.

Fig. 4 is a plan of the chain for use with this form of the differential.

Fig. 5 is a side elevation of a single link of the chain.

Fig. 6 shows a modified form of the apparatus for use as a counter shaft gear.

Fig. 7 shows a further modification hereafter referred to.

Similar symbols of reference are employed to denote the same parts in all the views:—

Figures 1, 2:
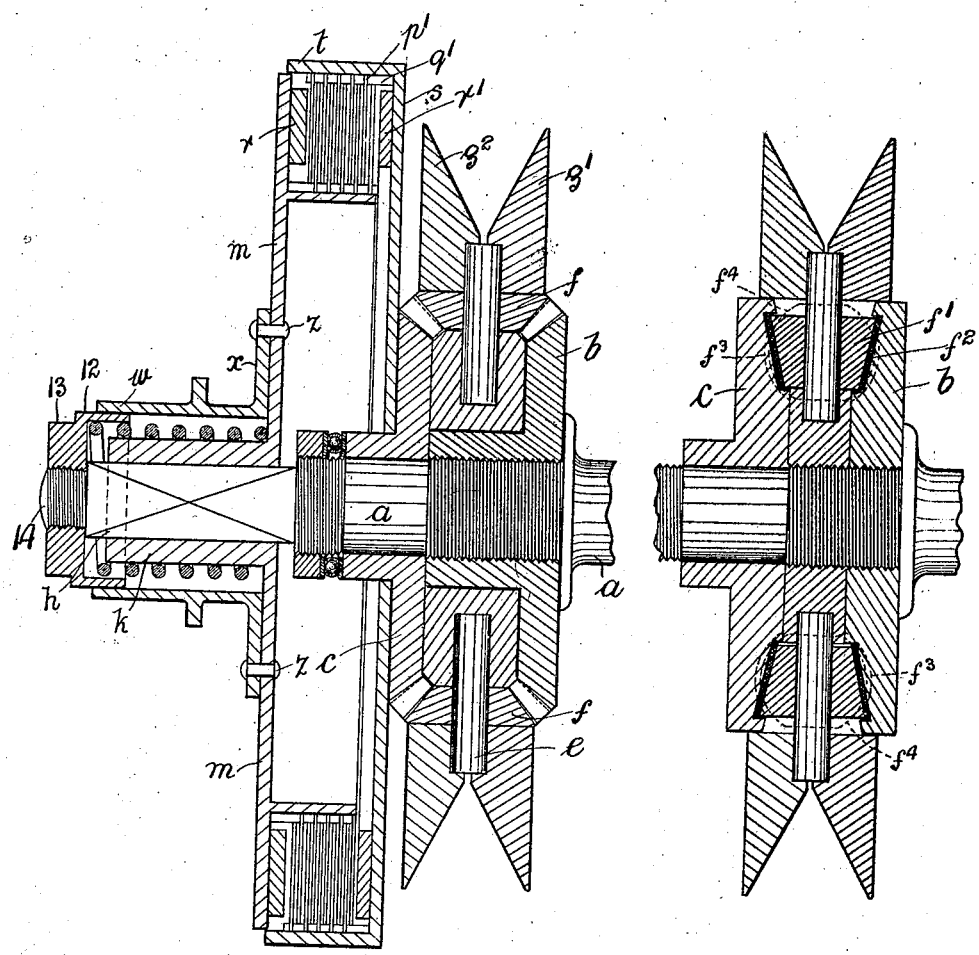
Fig. 1 is a longitudinal sectional elevation of the whole device.
Fig. 2 is a sectional elevation of a modified form in which friction gear is used in place of the bevel wheels and pinions.

Referring to Fig. 1, $a$ is the engine or other driving shaft, upon which is mounted so as to be rotatable therewith the bevel wheel $b$, forming one member of the differential gear.

The opposite member $c$ of the said gear is mounted loosely upon the shaft $a$, so that it is rotatable freely thereon. $d$ is a distance piece formed in one or more parts between the members $b$ and $c$, into recesses in which pass the spigots or ends of the axles $e$ of the planet pinions $f$.

The annulus carrying the pinions in the present case is constituted by two recessed plates $g^1$ and $g^2$ suitably clamped together, carrying the axles $e$ of the planet pinions $f$ and forming a belt pulley.

The shaft $a$ is provided with a squared portion at $h$. $k$ is a sleeve provided with a square hole on the interior adapted to fit and slide on the squared portion $h$ of the shaft.

Suitably formed with or carried by the sleeve $k$ is a disc $m$ which carries one half of a plate clutch $p$ being the friction plates and $q$ the supports. $r$ is a fibre or other suitable pad. $s$ is another disc adapted to rotate loosely on the shaft and with the bevel wheel $c$ of the differential. The disc $s$ is formed with an outer annular flange $t$ into which the plate $r$ can slide snugly so that the parts $r$, $s$ and $t$ form the casing of the clutch. $p^1$ are friction plates carried by the second member of the clutch and $q^1$ are supports, whilst $r^1$ is another fibre or other pad or block. $w$ is a sleeve formed or connected to a disc $x$ bolted to the disc $m$ by bolts $z$. 10 is a flange on the sleeve $w$, for the reception of an operating fork or the like. 11 is a helical compression spring surrounding the sleeve $k$ and located within the sleeve $w$. 12 is a cap adapted to carry the end of the spring 11 and to slide within the sleeve $w$ and formed or provided with a nut 13 screwing on to a screw threaded portion 14, of the shaft $a$.

The operation will be readily understood.

It is to be observed that the tendency of the spring 11 is to push the disc $m$ towards the right in Fig. 1, thus causing the friction plates $p$ and $p^1$ to be tightly pressed between the blocks $r$, $r^1$ causing the discs $m$ and $s$ and consequently the two bevel wheels $b$ and $c$ to run "solid." Under these circumstances the belt pulley formed by the plates $g^1$ and $g^2$ is carried round by the bevel pinions $e$ at the same speed and the transmission is at a maximum.

We will suppose that by the operation of the hand lever or pedal, the sleeve $w$ is drawn towards the left in Fig. 1.

As the said sleeve is drawn towards the left, the friction between the plates $p$ and $p^1$ diminishes enabling the disc $s$ to slip more or less and consequently the bevel wheel $c$ is driven with less velocity than the bevel wheel $b$ enabling the planet pinions $f$ to rotate more or less and diminishing the rate of drive in the ordinary well known manner, until finally when the friction between the plates $p$ and $p^1$ is entirely removed, the bevel wheel $c$ is driven by the planet pinions $d$ in the reverse direction and pulley is not driven.

In some cases I may provide a band brake on the outside of the casing $t$ of the friction clutch or other suitable braking means, so that the rotation of the plate $s$ can be stopped thus locking the bevel wheel $c$ from revolution and causing the pulley to be driven at half speed through the planet pinions the plates $p$ and $p^1$ being held out of contact.

In the construction shown in Fig. 2, the bevel pinions $f$ are replaced by friction members $f^1$ which are preferably made of metal, hard wood or any other material suitable for the purpose. They preferably have the shape of a truncated cone, or of a ball or of any other convenient shape, so as to frictionally engage the surfaces of the friction wheels $b$ and $c$. These wheels are each preferably formed with an annular recess $f^2$ at the bottom of which is a lining of hard rubber or other suitable material. When the members $f^1$ are formed of rotatable balls or the like, the recesses $f^3$ are preferably concave in cross section as shown in Fig. 2, in dotted lines $f^4$ representing the ball or other circular member.

Referring now to the modification illustrated at Figs. 3 to 5, in this case the two members $b$ and $c$ constituting the primary bevels of the differential are mounted close together the part $b$ rotating with the shaft $a$ and the part $c$ being free to rotate thereon.

The chain for use with this form of apparatus is illustrated at Figs. 4 and 5. Each of the links comprises a frame 14, pivotally connected by means of lugs 15, to the next link. Each of these frames carries a spindle or pin 16, upon which are mounted alternate thicknesses of leather and rubber or other suitable material 17 and 18. These pieces of leather and rubber are of disc shape and so formed that they constitute in combination a truncated cone, as seen clearly at Fig. 5. 19 and 20 are steel washers at the ends of the cone.

With this arrangement it will be seen that the planet members of the epicyclic or differential gear have simply been transferred to the chain, the operation remaining in other respects the same as already described.

Referring to Fig. 6, which illustrates the application of the invention as a countershaft gear, in this case the shaft $a$ is provided with a squared portion 21, and is screw threaded at the end 22. The bevel wheel $b$ forming one member of the differential is formed integral with or attached to a sleeve 23, fitting on the squared portion 21 of the shaft $a$ and a nut 24 secures the whole in position.

The counter shaft 25 carries a cup shaped fitting 26, which forms an annulus in which are mounted the spindles or spigots $e$ of the planet pinions $f$.

The other details of the friction clutch and the operating mechanism may be the same as those described with reference to Figs. 1 and 2.

Figure 7:
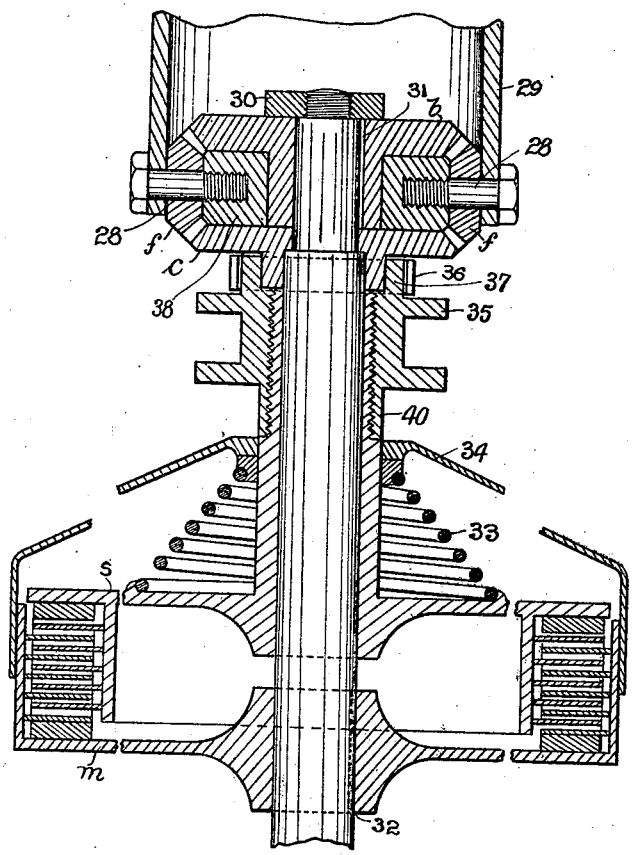

In the further modification shown at Fig. 7, the spigots 28 of the planet pinion $f$ take the form of bolts passing through the driven member 29 which is merely shown diagrammatically and may take the form of a cup, stirrup or the like. The member $b$ of the differential is mounted upon the principal shaft with the use of a feather and featherway or key 31, 30 being the securing nut. 32, is a similar key or feather for securing the plate m in position on the shaft. 33 is a spring mounted between a seating on the casing 34 and the plate s, 40 is a sleeve slidable with the plate s, and controlled from the operating collar 35. 36 are female dog teeth integral with the member f. 37 are male dog teeth adapted to engage therewith and forming part of and rotating with the operating collar 35.

With this arrangement it will be seen that the spring 33, as in the previous case tends to press the plates of the friction clutch into engagement, and owing to the position of the teeth 36 and 37 the parts f and 40 rotate together, whilst being free to slide with respect to one another.

The general operation is the same as that already described. By placing a band brake or other appropriate brake around the member 36, this member may be locked when the friction plates are disengaged and it is required to drive at half speed as previously explained.

It will be understood that minor constructions of detail may be introduced without departing from the principle of my invention.

What I claim and desire to secure by Letters Patent of the United States of America is:—

1. Change speed and clutching mechanism of the type in which differential gearing is employed, comprising in combination a driving shaft having fixed thereto a disc formed with an annular friction surface, a rotatable disc on said shaft also having an annular friction surface corresponding to the fixed disc, one half of a friction clutch fixed to said rotatable disc, a second half of a friction clutch slidable but non-rotatable on said shaft, and a driven member formed of a series of members pivoted together having friction surfaces to form a chain belt and adapted to engage the friction surfaces of both the fixed disc and the rotatable disc, for the purposes set forth.

2. Change speed and clutching mechanism of the type in which differential gearing is employed, comprising in combination, a driving shaft having fixed thereto a disc formed with an annular friction surface, a rotatable disc on said shaft also formed with an annular friction surface corresponding to the fixed disc, one half of a friction clutch fixed to said rotatable disc, a second half of the friction clutch slidable but not rotatable on said shaft, a spring normally pressing said second half of the clutch into engagement with the first half of the clutch, and a plurality of rotatable friction members mounted in links to form a chain and adapted to engage the annular friction surface on both the fixed disc and the rotatable disc.

3. Change speed and clutching mechanism of the type in which differential gearing is employed, comprising in combination a driving shaft having fixed thereto a disc formed with an annular bevelled friction surface, a rotatable disc on said shaft also formed with an annular bevelled friction surface, one half of a friction clutch fixed to said rotatable disc, a second half of the friction clutch slidable but non-rotatable on said shaft, a spring normally pressing said second half of the clutch into engagement with the first half of the clutch, a plurality of links pivoted together to form a chain, each of said links carrying a spindle, a plurality of discs on each of said spindles arranged together to form a truncated cone and adapted to engage the annular bevelled friction surface of both the fixed disc and the rotatable disc.

4. Change speed and clutching mechanism of the type in which differential gearing is employed, comprising in combination a driving shaft having fixed thereto a disc formed with an annular friction surface, a rotatable disc on said shaft also formed with an annular friction surface plate one half of a friction clutch fixed to said shaft, a second half of the said friction plate clutch slidable but non-rotatable on said shaft, a spring normally pressing said second half of the clutch into engagement with the first half of the clutch, a driven member formed with an annulus, a plurality of rotatable friction members engaging the annular friction surface of both the fixed and the rotatable discs, clutch teeth on said rotatable disc, and a member having clutch teeth fixed to the second half of the friction plate clutch, adapted at appropriate times to engage with the clutch teeth on the rotatable disc.

In testimony whereof I have hereunto subscribed my name.

CHARLES HENRY STRONG.